Oct. 16, 1923. 1,471,044

R. M. LOVEJOY

FRAME FOR AUTOMOBILES

Original Filed Aug. 31, 1916

Inventor.
Ralph M. Lovejoy
by Heard Smith & Tennant.
Attys.

Patented Oct. 16, 1923.

1,471,044

UNITED STATES PATENT OFFICE.

RALPH M. LOVEJOY, OF MEREDITH, NEW HAMPSHIRE.

FRAME FOR AUTOMOBILES.

Original application filed August 31, 1916, Serial No. 117,952. Divided and this application filed December 16, 1920. Serial No. 431,255.

*To all whom it may concern:*

Be it known that I, RALPH M. LOVEJOY, a citizen of the United States, and resident of Meredith, county of Belknap, State of New Hampshire, have invented an Improvement in Frames for Automobiles, of which the following description, in connection with the accompanying drawing, is a specification, like characters on the drawing representing like parts.

This invention relates to improvements in chassis for vehicles, particularly those used in automobile constructions. The present application is in part a division of my prior application Serial No. 117,952, filed August 31, 1916.

The principal object of the invention is to provide strengthening means for the frame which will more effectively resist torsional strains and which will relieve in a great measure the strains which in usual constructions are imposed upon the body of the automobile.

The invention further contemplates a frame of such rigidity as to eliminate as far as possible the strains which are imposed upon the driving and braking mechanisms due to the twisting of the usual types of frames when the vehicle is driven over a rough or uneven road-bed.

Other objects and features of the invention will more fully appear from the following description and the annexed drawings and will be pointed out in the accompanying claims.

The usual construction of automobile frames comprises a pair of side rails which either converge from the rear toward the front end or comprise parallel front and rear portions with an intermediate offset portion, said rails being connected at their points and at various portions throughout their length by cross bars or girders. While these cross bars serve to tie the rails together they do not brace the frame strongly against torsional strains.

One of the objects of the present invention is to provide a frame of the character described with one or more cross girders relatively large in size and of hollow formation which is adapted to stiffen the frame against torsional strains, thereby reducing the strains upon the body of the car and upon the driving and controlling mechanisms of the car and prolonging its life and also preventing creaking or rattling which frequently occurs from such torsional strains.

A preferred embodiment of my invention is illustrated in Figs. 1 to 4 inclusive in which a frame is shown which comprises side rails having parallel rear portions 1, 2, intermediate converging portions, 3, 4, and parallel front portions 5, 6, said rails being connected by the usual cross bars 7.

Figure 1:
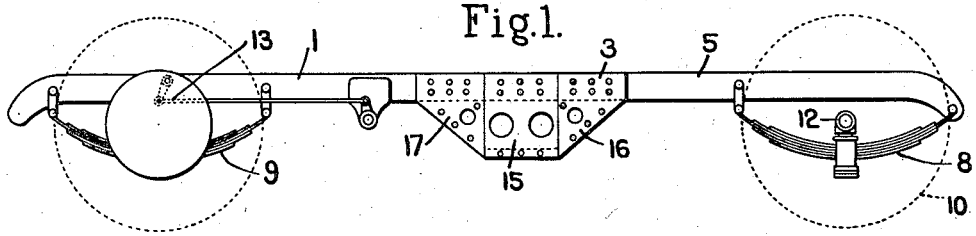
Fig. 1 is a side elevation of an automobile frame showing an improved box-like strengthening central girder applied thereto, and also illustrating the supporting means for the frame including the springs and wheels which are shown in dotted lines.
Figure 2:
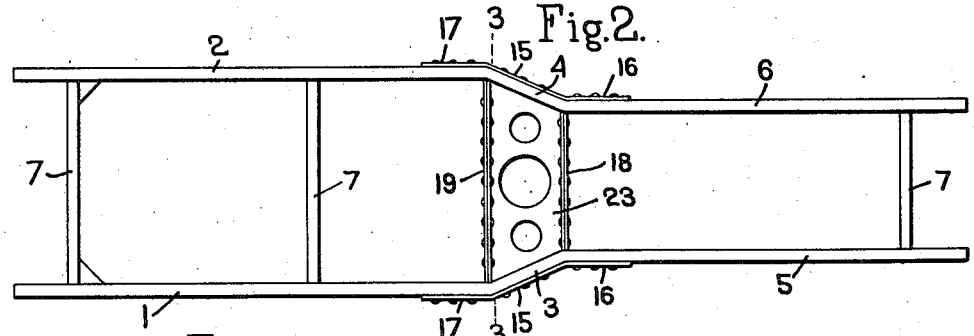
Fig. 2 is a plan view of the frame.
Figure 3:
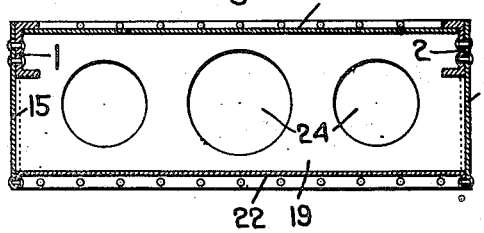
Fig. 3 is a transverse sectional view on line 3—3, Fig. 2.
Figure 4:
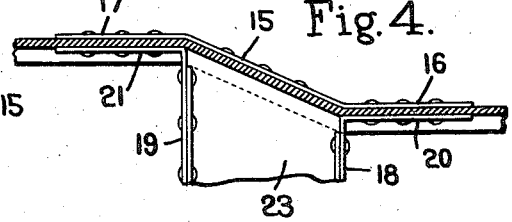
Fig. 4 is a longitudinal sectional view of a portion of one of the side rails showing the box-like central girder structure and its connection thereto.

As illustrated in Fig. 1 the frame is suspended upon the usual springs 8, 9, resting upon axle braces having axles for the wheels 10, 11, diagrammatically shown in dotted lines, the front axle being carried upon steering knuckles 12 and the rear wheels being provided with brakes 13.

In order to impart strength and rigidity to the frame I have provided one or more additional cross members each of which preferably is in the form of a hollow tubular or box-like girder or girders connected at the ends respectively to the side rails preferably at the opposite portions 3, 4 thereof.

In the usual frame construction the side rails are channel bars and the improved girder is secured to such channel bars by rivets, welding, or other suitable fastening. The improved form of girder illustrated herein is a box-like construction built up of plates of rolled steel, the ends comprising rectangular plates 15 of greater width than the side rails and having laterally extending flanges or wings 16, 17, said end plates and flanges preferably being riveted to the outside of the channel bars which form the side rails of the frame.

These end plates are connected by vertical plates or webs 18, 19 which desirably are provided respectively with flanges 20, 21 which are riveted or welded to the web of the channel bars forming the side rails and are also riveted or welded to the end flanges or wings 16, 17 of the end plates.

The bottom of the girder comprises a rectangular plate 22 having a marginal flange which is riveted or welded throughout to the lower edges of the end plates 15 and side plates 18, 19. The top of the girder comprises a plate 23 preferably seated within the channels of the side rails and is provided with upwardly extending flanges which are secured to the vertical cross plates 18, 19 by rivets or welding.

Apertures 24 may be made in the vertical and horizontal plates to lighten the girder construction and also to provide room for the main driving shaft and other parts of the actuating and controlling mechanism.

The box-like girder may be of any desired size, but preferably is considerably larger in cross section than the cross sections of the side rails so that the desired amount of rigidity may be given to the frame. Such a box-like girder affords great resistance to torsional strains so that a frame equipped with one or more of these girders remains substantially rigid under all running conditions.

Figure 5:
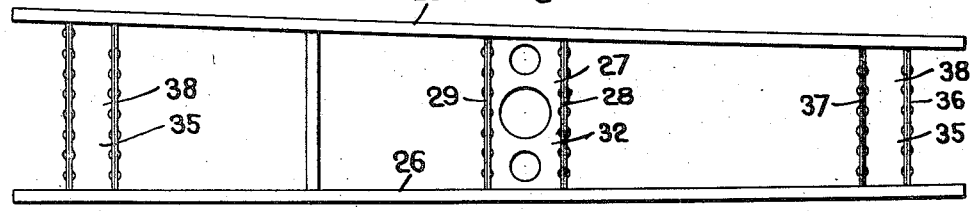
Fig. 5 is a plan view of a different type of frame provided not only with a central strengthening girder, but also with strengthening girders located adjacent the ends of the frame; and, Fig. 6 is a side elevation of the same.

In Fig. 5 a different form of frame is illustrated which comprises straight side rails 25, 26, the central portions of which are connected together by a box-like girder 27 of a character above described, comprising vertical plates or webs 28, 29, having at their ends respectively flanges 30, 31 which are rigid with the side rails 25, 26, and a top plate 32 and bottom plate 33 which are secured to the vertical webs 28, 29. In this construction the side rails 25, 26 desirably are provided with wider central portions 34 slightly broader than the depth of the box-like girder and the ends of the bottom plate 33 desirably may be secured directly to the girder by suitable rivets or other fastening.

Figure 6:
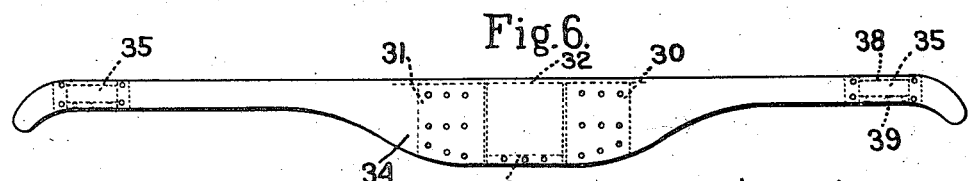

In the construction illustrated in Figs. 5 and 6 the end portions of the frame desirably are also provided with box-like girders 35 of similar construction to the main central strengthening girder. These girders have vertical plates or webs 36, 37 riveted at their ends to the side rails 25, 26, and top and bottom plates 38, 39 riveted to the vertical plates or webs. By reason of this construction a still more rigid frame is provided which will resist the torsional strains caused when the vehicle is driven over rough or uneven surfaces.

It will be understood that the embodiment of the invention particularly disclosed herein is illustrative and not restrictive and that the invention as covered by the claims herein comprises any form of tubular girder or girders used for the purpose of strengthening the frame.

Having thus described my invention, what I claim as new, and desire to secure by Letters Patent, is:

1. A frame for vehicles comprising side rails, girders connecting the end portions of said side rails and a box-like central girder of rectangular cross section having vertical plates provided with flanges extending longitudinally of said side rails and secured thereto, said central girder providing a rigid box-like construction adapted to resist torsional strains upon the frame.

2. A frame for vehicles comprising side rails, girders connecting the end portions of said rails and an intermediate hollow girder comprising vertical and horizontal metallic plates rigidly secured at their ends to said side rails and connected together along their edges to form a rigid closed box-like construction adapted to resist torsional strains imposed upon said frame.

3. A metallic frame for vehicles comprising side rails, girders connecting the end portions of said rails, and an intermediate strengthening girder comprising end plates wider than the side rails and of relatively large area rigidly secured to said side rails, vertical webs or cross plates having laterally flanged ends secured to said side rails and said end plates and top and bottom plates respectively secured rigidly to said side rails and end plates and rigidly connected along their edges to adjacent edges of said vertical cross plates.

4. A frame for vehicles having side rails presenting parallel rear portions, intermediate offset portions, and parallel front portions lying closer together than the rear portions, girders connecting respectively said front and rear parallel portions and a hollow box-like girder of rectangular cross section connecting said offset portions adapted to strengthen said frame against torsional strains.

5. A frame for automobile chassis comprising side rails presenting parallel rear portions, intermediate offset portions and parallel front portions lying closer together than said rear portions, cross bars connecting respectively said front and rear parallel portions and a hollow girder connecting said offset portions comprising relatively large end plates secured to the outsides of said offset portion and having wings secured to said front and rear portions, vertical webs or cross plates having wings connected to the front and rear portions of said rails and to the wings of said end plates, and top and bottom plates rigidly connected respectively at their ends to said side rails and to said end plates and connected along their edges to adjacent edges of said vertical cross plates to form a hollow box-like construction adapted to strengthen the frame against torsional strains.

6. A frame for automobiles comprising side rails connected by a hollow box-like cross member of rectangular cross section having alined open apertures to permit the passage of members of the actuating or controlling mechanisms therethrough.

7. A frame for vehicles comprising side rails and a hollow central girder of rectangular cross section having vertical walls extending transversely of the girder and substantially equal in width to the central portion of the girder, said vertical walls being provided with flanges extending longitudinally of said side rails and secured thereto, said central girder providing a rigid box-like construction adapted to resist torsional strains upon the frame.

In testimony whereof, I have signed my name to this specification.

RALPH M. LOVEJOY.